United States Patent [19]

Muma

[11] Patent Number: 4,538,928

[45] Date of Patent: Sep. 3, 1985

[54] SCREW RING CONE RETENTION APPARATUS AND METHOD FOR ROCK BITS

[75] Inventor: Brian C. Muma, Huntington Beach, Calif.

[73] Assignee: Smith International, Inc., Newport Beach, Calif.

[21] Appl. No.: 629,015

[22] Filed: Jul. 9, 1984

[51] Int. Cl.³ .................... F16C 43/04; E21B 10/08
[52] U.S. Cl. ............................... 384/96; 29/456; 76/108 A; 175/369; 384/903; 403/326
[58] Field of Search ............ 384/92, 96, 903; 308/DIG. 11; 175/366, 369, 370, 371; 76/108 A; 29/456; 403/326, DIG. 7; 411/353, 517, 530

[56] References Cited

U.S. PATENT DOCUMENTS

| | | | |
|---|---|---|---|
| 3,746,405 | 7/1973 | Welton | 384/93 |
| 4,157,122 | 6/1979 | Morris | 175/369 |
| 4,161,343 | 7/1979 | Brashear | 384/96 |
| 4,236,764 | 12/1980 | Galle | 384/96 |
| 4,317,602 | 3/1982 | Orain | 308/DIG. 11 |
| 4,344,658 | 8/1982 | Ledgerwood, III | 384/96 |
| 4,444,518 | 4/1984 | Schramm et al. | 384/96 |

Primary Examiner—Stuart S. Levy
Assistant Examiner—David Werner
Attorney, Agent, or Firm—Robert G. Upton

[57] ABSTRACT

This invention teaches a means to retain a cutter cone onto a journal bearing of an earth boring rotary cone rock bit. Complementary and registering annular grooves are formed in the bearing surfaces of the journal and the cone. A tangential entry groove transitions from an end of the journal to the annular groove in the journal. Simultaneous 360° rotation and axial movement of the cone over the journal, in combination with a ring distortion ramp block in the cone, threads an end of a split cone retention ring through the entry groove in the journal into the registering annular grooves, thereby retaining the cone on the journal.

20 Claims, 6 Drawing Figures

SCREW RING CONE RETENTION APPARATUS AND METHOD FOR ROCK BITS

BACKGROUND OF THE INVENTION

1. Field of the Invention

This invention relates to a method and apparatus to retain rotatable cutter cones on bearing journals of earth boring rock bits.

More particularly, this invention relates to a means to retain a rotary cone on the bearing journal of a rock bit by utilizing a split toroidal ring that is deformed and "threaded" into a groove formed between the cone and the journal.

2. Description of the Prior Art

Over the years several methods have been patented to retain rotary cutters onto journals of rock bits.

U.S. Pat. No. 3,746,405 describes a three cone rock bit, one of the embodiments of which describes a combination which includes a snap ring cone retention method. To assemble the rotary cone onto the journal, the split snap ring is radially compressed within a radially disposed groove formed in the journal. The depth of the groove is sufficiently deep to completely contain the snap ring so that the cone may slip over the outer surface of the snap ring during assembly. A complementary radially disposed groove is formed in the cone, the depth of the groove being about half the thickness of the snap ring. When the complementary groove in the cone registers with the groove in the journal, the snap ring moves into the groove in the cone, thus retaining the cone onto the journal.

U.S. Pat. No. 4,157,122 describes yet another method to assemble a rotary cone onto a journal bearing of a rock bit. Complementary grooves are formed in a journal bearing sleeve and the rotary cone. The sleeve is retained on a cone spindle bearing by an annular flange at the end of the spindle. The cone is axially moved over the journal bearing sleeve to align the two radially disposed grooves in the journal bearing sleeve and the cone. A hole is drilled through the exterior of the rotary cone in alignment with the radially disposed groove adjacent the cone bearing surface. The hole formed in the cone tangents the annular groove in the cone such that a retention rod, when placed in the hole, moves into the registering grooves or slots formed between the journal sleeve and the cone. The rod is forced into the registering grooves to retain the rotary cone onto the journal bearing sleeve. The spindle bearing, with assembled cone rotatably attached, is then welded into a recess in a leg of the rock bit.

U.S. Pat. No. 4,161,343 teaches still another cone retention system. The method taught incorporates one or more radially disposed rods in the journal bearing that engage with an annular groove formed in a rotary cone. When the groove in the cone aligns with the radially disposed holes in the journal, the rods are moved radially outwardly by a pointed pin that engages the inward ends of the rod and urges the rods radially into engagement with the groove in the cone. The pin is subsequently welded within the bearing journal, thus forcing the rods into engagement with the groove in the cone.

Two closely related patents issued to Hughes Tool Company, U.S. Pat. Nos. 4,236,764 and 4,344,658, describe a snap ring cone retention method that functions as follows. Again, a radially disposed groove is formed in the journal and a complementary groove is formed in the cone. When the two grooves are in registering alignment, a snap ring retained or forced into the groove in the journal snaps into the groove in the cone to rotatably retain the cone onto the journal. A further refinement includes a means to prevent the cone from falling off the journal by a special radial alignment of the registering grooves in the journal and the cone. The snap ring retaining the cutter onto the journal is urged toward the annular cone retainer groove when the cone is subjected to an inward thrust, thus preventing the cone from becoming disengaged from the journal bearing. The later commonly assigned '658 patent further refines the relationship of the snap ring with the complementary grooves formed between the journal and the cone.

Finally, U.S. Pat. No. 4,444,518, assigned to the same assignee as the present invention, describes still another cone retention method that utilizes spring means in combination with segmented cone retention means to retain a rotary cone onto a journal. The apparatus taught in the '518 patent basically utilizes a series of segmented rings to retain the rotary cone onto the journal. The segmented rings, for example, are inserted into a relatively deep annular channel formed transverse to the axis of the journal of a rock bit leg assembly. A complementary channel, shallow in depth, is formed in the cone. The cone, when properly positioned on the journal, closes out the channel formed in both the cone and the journal. Upon assembly, the segments are urged within the deep groove or channel in the journal such that each of the segments do not protrude beyond the bearing surface as the cone is passed over an end of the journal. Means are provided adjacent the cone retention segments to accept a spring biasing means to urge each segment away from the bottom of the deep groove in the journal. When the cone is placed over the journal, each of the segments, when they register with the complementary groove in the journal, snaps into place; thus locking the cone onto the journal.

The present invention differs from all of the aforementioned prior art in that a toroidal split ring is utilized that is "threaded" onto a journal bearing during assembly of the rotary cone onto the journal. The cone, with the split ring contained within the cone, is placed over the end of the journal. A tangential opening for the split ring is formed in the journal such that an end of the split ring will engage the opening in the journal to guide the end of the split ring into the journal retention groove as the cone is rotated onto the journal. An angularly disposed pin connected to the cone forces an end of the split ring into engagement with the tangential opening formed in the journal to guide the split end of the ring into the cone retention annular groove in the journal. Rotation of the cone with respect to the journal forces the end of the toroidal ring into the journal retention groove. A 360° rotation of the cone fully engages the toroidal split ring into the groove in the cone, thereby retaining the cone onto the journal. Once the split ring is forced into the radially disposed groove in the journal, the toroidal ring returns or "snaps back" to its original shape.

The toroidal split ring of the instant invention does not have to be compressed during assembly of the cone onto the journal. When prior art snap rings spring back after assembly, a gap exists between ring ends that could interfere with the free rotation between the relative parts, namely, the journal and the cone. There is essentially no gap between the toroidal ring ends, thereby providing a stronger and less abrasive means to retain the cone on the journal. A smooth rotational potential therefore exists between the relative parts.

Moreover, snap rings or the like require that one of the registering grooves be radially deep enough to completely contain the compressed snap ring during assembly of the cone onto the journal. This necessarily results in a weakened journal or cone due to the removal of metal from either the cone or the journal. This is especially critical with respect to the journal in that deep annular grooves in the journal provide a weakened area that could cause stress fractures through the recessed area. The present invention requires the radial depth of the registering grooves be only deep enough to accept one-half the radial cross section of the cone retention ring, thereby removing the minimum amount of metal from the journal and the cone.

Additionally, the toroidal split ring of the present invention does not radially engage either the journal or the cone when assembled. The ring freely "floats" in the annular registered grooves in the journal and the cone. The surface feet per minute "slip" velocities are therefore reduced by about half with respect to the ring, the cone and the journal bearing, thereby resulting in less wear and longer rock bit life.

SUMMARY OF THE INVENTION

It is an object of this invention to provide a split ring means to retain a rotary cone onto a journal of a rock bit.

It is another object of this invention to provide more bearing surface between the journal bearing and the complementary bearing recess in a cone by utilizing a novel split ring cone retention method.

It is still another object of this invention to eliminate a conventional ball hole drilled through the journal bearing, thus strengthening the journal projecting from a leg of the rock bit.

An apparatus is disclosed to retain a rotary cutter cone on a journal of an earth boring rock bit that consists of a rock bit body that forms a first pin end and a second cutter end. A journal bearing projects from a leg that extends from the bit body, the journal bearing being adjacent the second cutting end of the rock bit. A rotary cutter cone that forms cone bearing surfaces therein is mated to complementary bearing surfaces formed on the journal bearing that projects from the leg of the bit body.

A cone retention means is formed between the journal and the cone. The cone retention means includes complementary and registering annular grooves formed in the journal and in the cone. A tangential entry is formed by the journal from an end of the journal to the annular groove in the journal. A split cone retention ring is placed within the bearing surfaces formed in the cone. The split ring gains access to the tangential entry in the journal when an end of the split ring is distorted and forced into the tangential entry by a wedge means retained in the cone. The end of the split ring is distorted adjacent the tangential entry and simultaneous rotation of the cone through 360° while axially moving the cone over the journal results in the split ring being threaded through the tangential entry in the journal into the groove in the journal and the cone, thereby rotatively retaining the cone on the journal.

Once the split ring is fully contained within the registering annular grooves formed in the journal and the cone, the split ring "snaps back" to its original nondistorted shape, thus providing a secure means to rotatively retain the cone onto the journal.

The split ring is preferably toroidal in shape, having split ends of the toroidal ring rounded to ease access of one split end of the ring into the tangential entry to the annular groove in the journal.

An advantage then of the present invention over the prior art is the elimination of the conventional ball hole formed through the journal to accept a multiplicity of spherical balls into registering annular tracks to retain a cone onto a journal.

Yet another advantage of the present invention over the prior art is the increased bearing surfaces formed both on the journal and the cone, thereby prolonging the bearing life during rock bit operation.

Still another advantage of the present invention over the prior art is the minimum amount of material removed from the journal and the cone to form the registering annular grooves therebetween, thus resulting in stronger components thereby.

Yet another advantage of the present invention over the prior art is the free-floating aspect of the toroidal ring that is nested within registering annular grooves formed between the journal and the cone. The cone retention ring does not engage in a nonrotational manner either the cone or the journal.

Another advantage of the present invention over the prior art is that there is essentially no gap between ends of the split cone retention ring, thus resulting in a more secure and smoother operation of the rotating cone on the journal.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
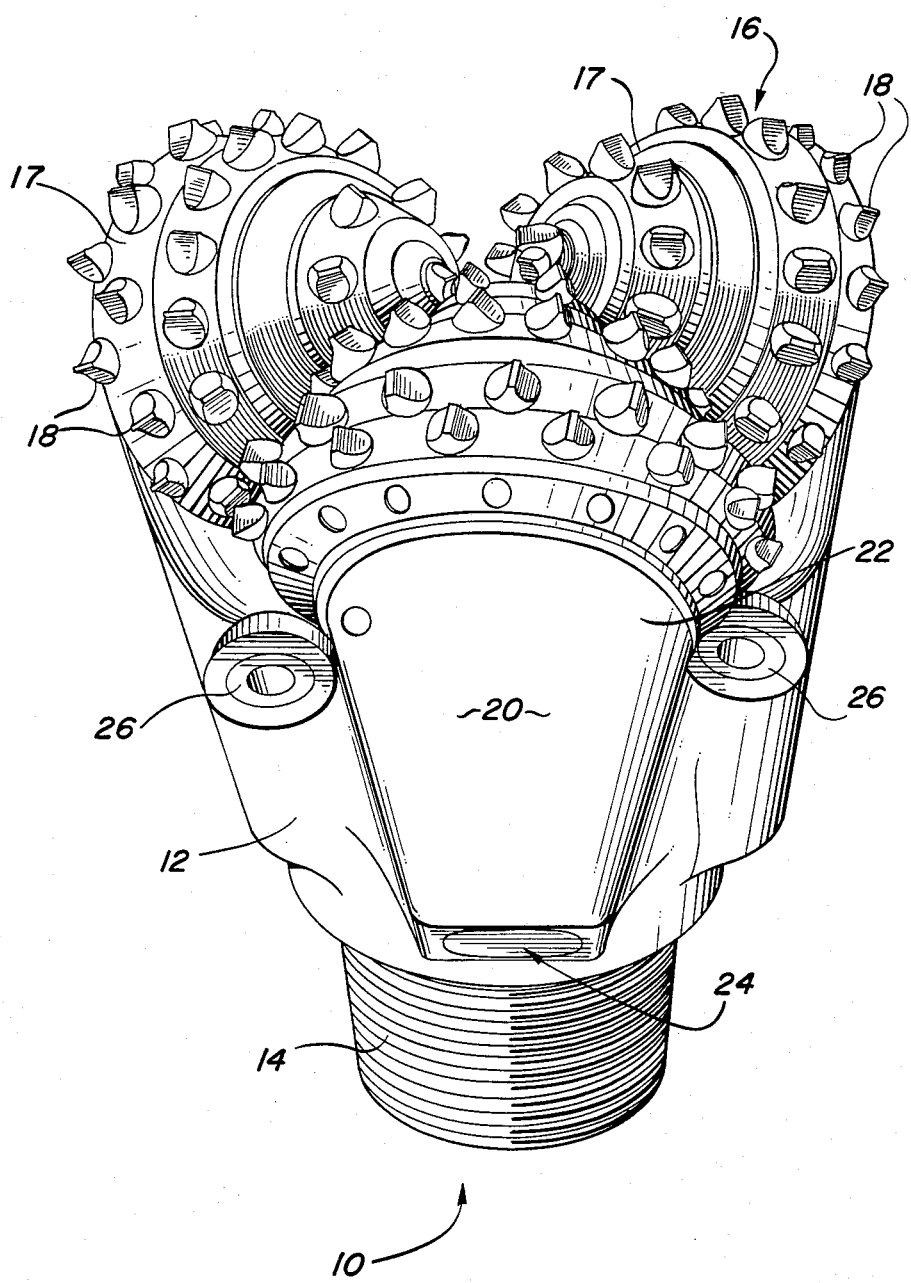
FIG. 1 is a perspective view of a typical three cone rotary rock bit.

Referring now to FIG. 1, a sealed bearing rotary cone rock bit, generally designated as 10, consists of rock bit body 12, forming an upper pin end 14, and a cutting end, generally designated as 16. One or more cutter cones 17 comprise the cutting end 16, each of the cones being rotatively attached to legs 20 extending from bit body 12. Each of the cones 17 has, for example, a multiplicity of equidistantly spaced tungsten carbide inserts 18 interference fitted within the cone body 17. A grease reservoir system, generally designated as 24, is associated with each of the legs 20 of the rock bit 10. A shirttail 22 terminates the end of leg 20 and is immediately adjacent the rotatable cones 17. Hydraulic mud is routed through a drillstring (not shown) into pin end 14 and out through nozzles 26. The "mud" serves to lift detritus off the borehole bottom while, at the same time, cooling and cleaning the cutter cones as they work in a borehole.

Figure 2:
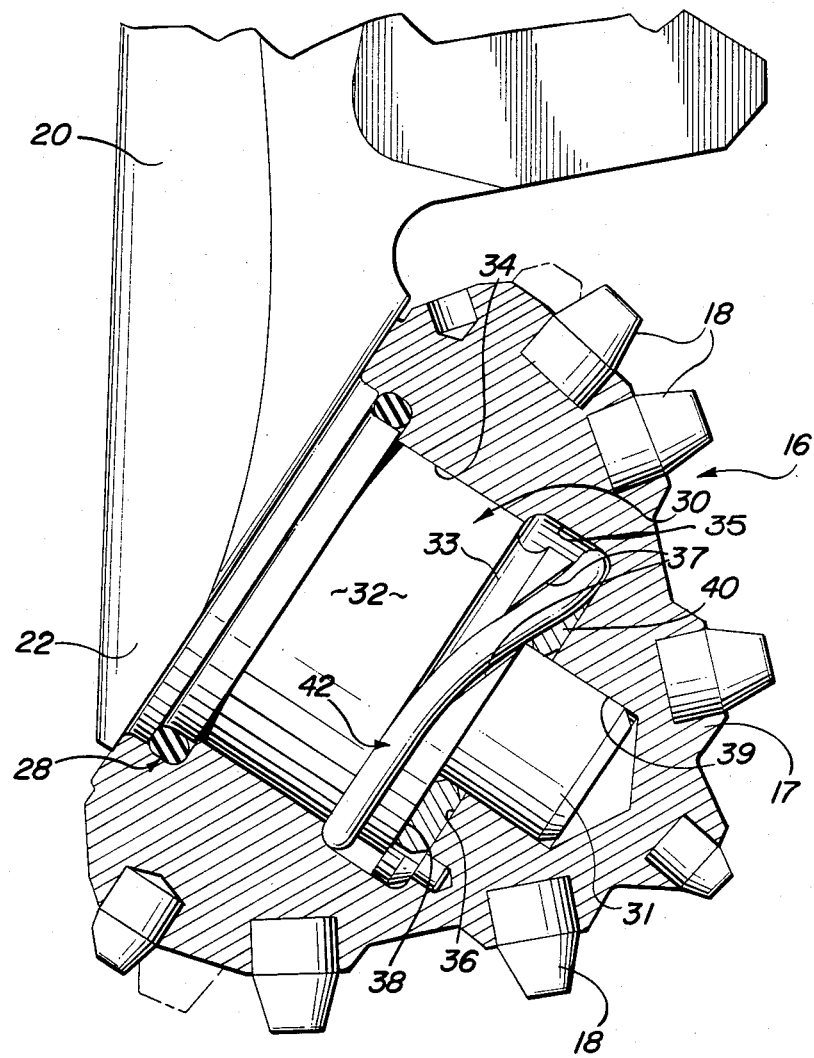
FIG. 2 is a partially cut away view of a cone partially assembled on a journal of a rock bit.

Turning now to FIG. 2, the cut away cone 17 is shown partially secured to a rock bit journal, generally designated as 30. The journal 30 projects from the rock bit leg 20 nearest the shirttail portion 22. Journal 30 forms a bearing surface 32 that terminates at a "snoochie" face 38. Projecting from snoochie face 38 is a spindle or pin 31. The cutter cone 17 is formed with complementary bearing surfaces 34 that mate with bearing surface 32 of journal 30. The end of the bearing cavity in the cone terminates in a radial face 36 that parallels snoochie face 38 in journal 30. A further cylindrical recess 39 formed in the cone 17 serves to provide a bearing surface for the spindle 31. A radial thrust washer 40, for example, is positioned between snoochie face 38 and radially disposed surface 36 in cone 17. An elongated annular groove 35 is formed within cone 17, the recess portion 35 serving to retain a split ring cone retention device, generally designated as 42. A complementary annular groove 33 is formed near the end of journal 30. Groove 33 has a cross section that mates with a cross section of the split ring 42. A tangential split ring entry groove 37 is formed in the end of journal bearing 30. The tangential entry groove 37 begins adjacent snoochie face 38 and tangents annular groove 33 such that the entry groove leads gradually from snoochie face 38 to the annular groove 33 in journal 30. The tangential entry groove, of course, serves to accept an end of the split cone retention ring 42 as the end is distorted out of alignment with an opposite end of the ring into the entry groove 40 to gradually thread the toroidal retention ring into groove 33. When the cone is properly positioned onto the journal, annular groove 35 in the cone and groove 33 in the journal register one with the other.

Figure 3:
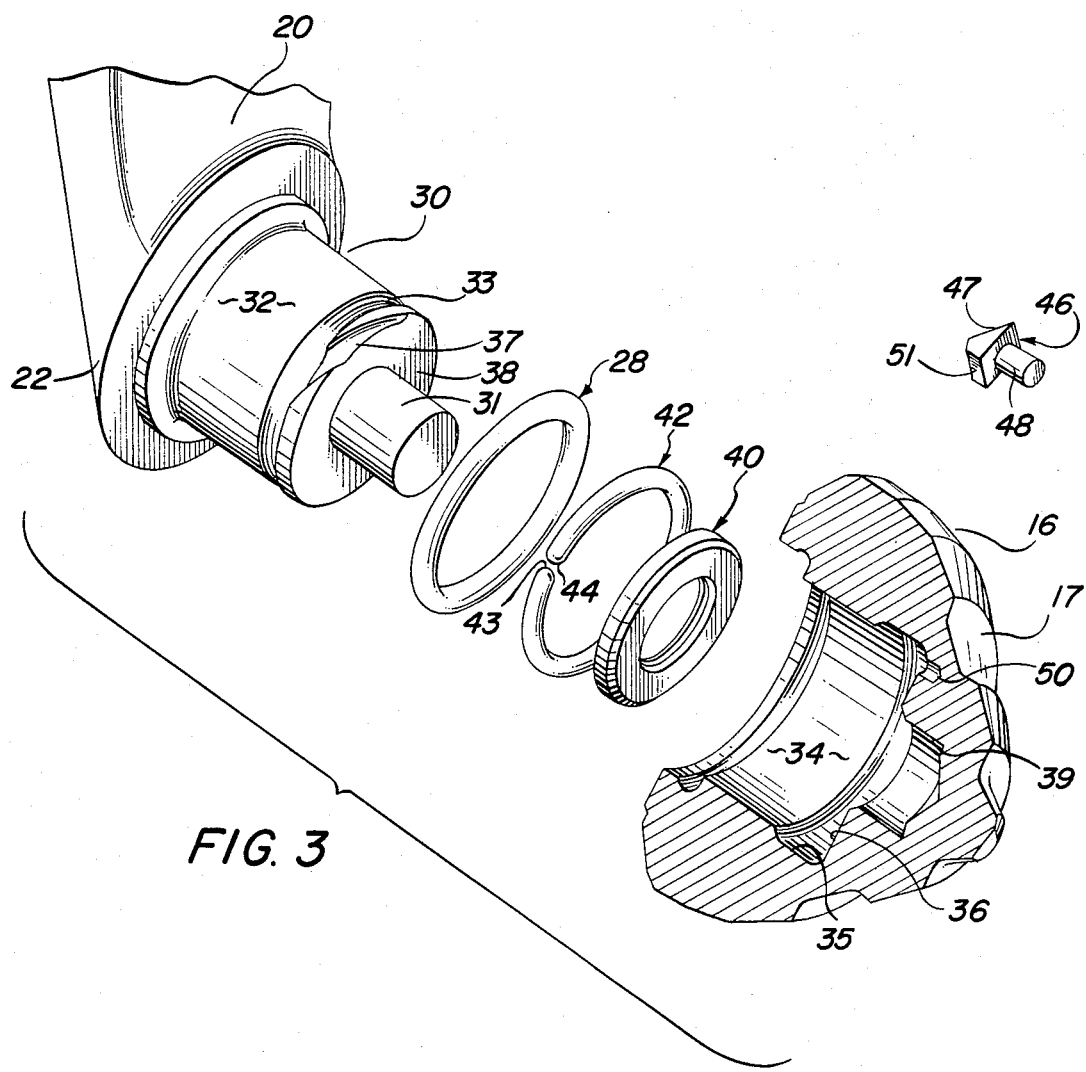
FIG. 3 is a partially cut away exploded perspective view of a portion of a leg, a cone and components to assemble the cone on the journal.

With reference now to FIG. 3, the exploded view clearly illustrates the various components of the cone retention system and how they mechanically relate to each other. Prior to assembly of the cone 17 onto the journal 30, a split ring distortion ramp mechanism, generally designated as 46, is inserted within ramp pin recess 50 in cone 17. The ramp pin 46 has an angled surface 47 which contacts the split ring upon assembly of the ring within annular grooves 35 and 33. With the ramp pin 46 in position in the cone 17, the split ring is placed within the annular recess 35 in the cone. The radially disposed thrust washer 40 is then placed adjacent radial surface 36 in cone 17. A resilient O-ring seal 28, for example, is then placed over the journal bearing surface 32 adjacent the shirttail portion 22. It would be obvious to utilize other conventional seals in place of the O-ring, such as a belleville seal. The cone then is placed axially over the bearing surface 32 of the journal bearing 30. Ends 43 and 44 of the split ring 42 are so aligned that they are in contact with the ramp pin 46. End 43 abuts against the ramp pin 46 at surface 51 and end 46 is positioned adjacent angle surface 47 of the ramp pin 46. By rotating the cone counterclockwise and forcing the cone axially inwardly onto the journal bearing 30, the end 44 of split cone retention pin 42 is distorted so that it will align itself with the tangential entry groove 37 in journal bearing 30. A counterclockwise 360° rotation of the cone will threadably engage the split retention ring 42 into the registered annular grooves 33 and 35 between the journal 30 and the cone 17. Once the cone retention ring 42 is fully engaged within the registering complementary grooves 33 and 35, the cone retention ring "snaps back" or returns to its relaxed state (end 43 and 44 in alignment with each other). Ring 42 thus provides a means to rotatively retain cone 17 onto the journal.

The reason the cone 17 is threaded onto the journal 30 counterclockwise is to discourage the cone from "unthreading" itself during operation of the rock bit 10 in the borehole. The cone normally rotates on journal 30 counterclockwise since the bit rotates counterclockwise in the borehole.

The material used to fabricate the retention ring 42 could be selected from a metal group such as steel, steel alloy, copper, a copper alloy (such as beryllium copper), bronze, aluminum, or an aluminum alloy (such as aluminum bronze).

The split ring 42 could also be fabricated from a recently developed spinodal alloy (a combination of copper, nickel and tin). Spinodal alloys have the unique qualities of high tensile strength and toughness, combined with good bearing potential that results in an ideal material for cone retention rings as described and claimed in the present invention. However, for the particular application set forth in this invention, beryllium copper would be the preferred material for the toroidal split cone retention ring 42.

Figure 5:
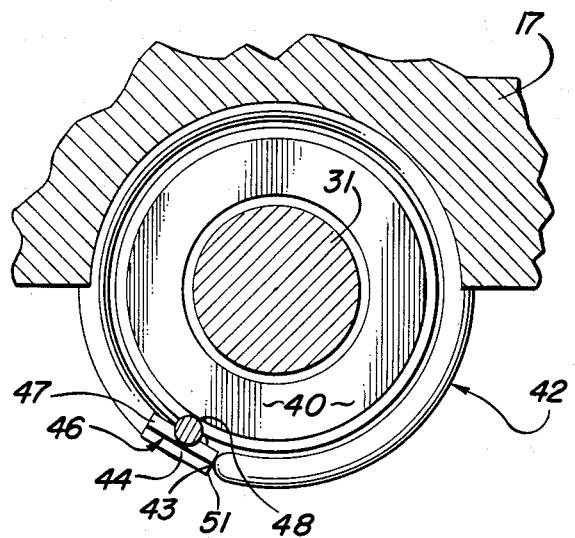
FIG. 5 is a view taken through 5—5 of FIG. 4, illustrating a partially cut away view of the retainer ring being assembled onto the journal bearing.
Figure 4:
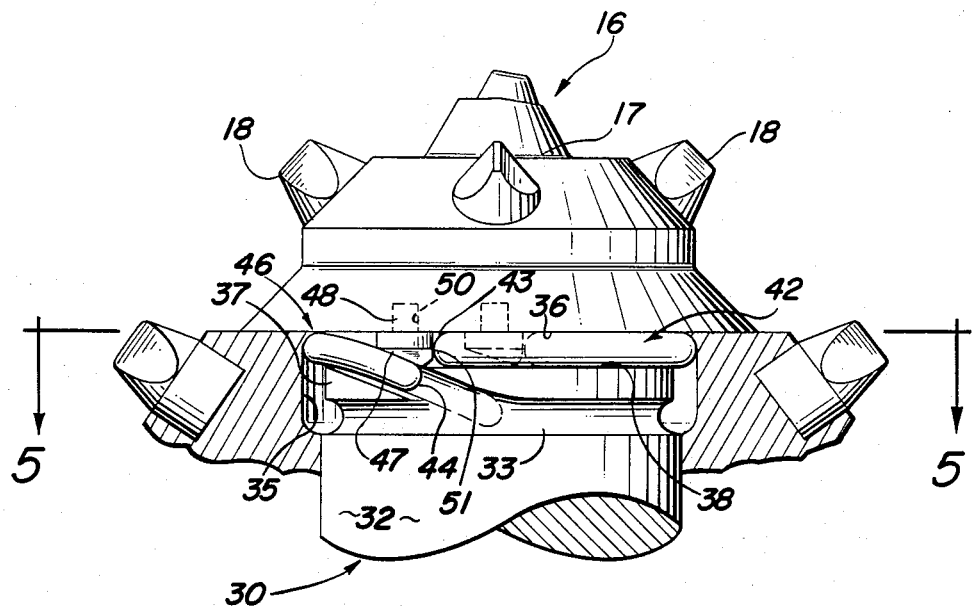
FIG. 4 is a partially cut away cross section of a cone as it is being assembled onto a journal of a rock bit with the retention retainer spring or ring partially engaged with a tangential entry to a groove in the journal bearing.

FIGS. 4 and 5 illustrate the relationship of the rounded end 43 of cone retention ring 42 adjacent surface 51 of the ramp pin 46, the opposite end 44 of cone retention ring 42 being distorted against angled ramp surface 47 of pin 46. Thus it can be appreciated that the ramp mechanism 46 provides a means to threadably engage end 44 of retention ring 42 within the tangential entry groove 37 in the journal 30. Once the cone retention ring 42 is in place, ramp pin 46 does not interfere in any way with the rotation of the cone on the journal. Thrust bearing washer 40 is shown positioned over spindle 31 extending from the journal bearing 30.

Figure 6:
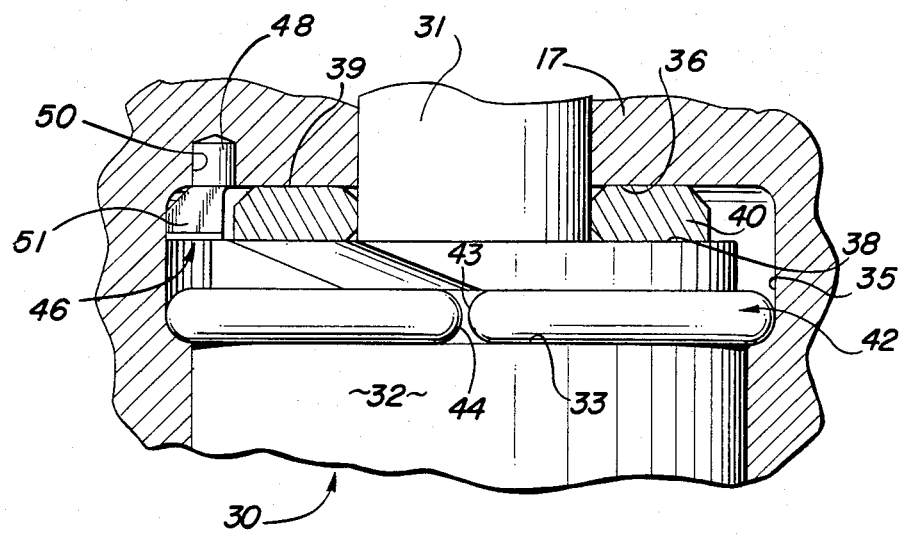
FIG. 6 is a partially cut away cross section of the fully assembled toroidal cone retention ring in the registering annular grooves between the journal bearing and the cone.

The partially broken away section as shown in FIG. 6 illustrates the toroidal cone retention ring 42 fully engaged with the annular groove 33 in journal 30 and the annular groove 35 in cone 17, the toroidal cone retention ring 42 being returned to its natural or relaxed state to freely and rotatively retain the cutter cone 17 onto the journal 30. It can readily be seen that the ramp pin 46, having served the purpose of engaging the cone retention pin into the retaining grooves 33 and 35, is now rendered harmless. Again, the radially disposed thrust washer 40 serves to provide a bearing means between radial surfaces 38 and 36 defined by journal 30 and cone 17.

It would be obvious to eliminate the radial thrust bearing 40 and extend the snoochie face 38 to contact or be immediately adjacent radial surface 36 in cone 17 without departing from the teachings of this invention.

It would additionally be obvious to orient the tangential entry groove 37 in the ramp pin 46 opposite to that illustrated in the drawings. This would require a 360° clockwise rotation of the cone to place split ring 42 into registering grooves 33 and 35 in the journal and the cone. It would also be obvious to utilize a split ring cone retention device with a cross section other than circular. For example, the ring cross section could be square or rectangular (not shown). The corresponding annular grooves, of course, would be square or rectangular to mate with the split ring configuration utilized.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. An apparatus to retain rotary cutter cones on journal bearings of an earth boring rock bit comprising:
   a rock bit body forming a first pin end and a second cutter end, one or more journal bearings project from one or more legs extending from said bit body, said journal bearings being adjacent said second cutter end,
   said rotary cutter cone forming cone bearing surfaces therein, said cone bearing surfaces complement bearing surfaces formed by said journal bearing projecting from said leg of said bit body,
   complementary and registering annular grooves formed by said cone and said journal bearing, a tangential entry groove is formed in said journal, said entry groove extends from an end of said journal to said annular groove in said journal,
   a split cone retention ring, said split cone retention ring having first and second ends, said ring is positioned in said annular groove in said cone prior to assembly of the cone onto the journal, and
   means retained within said cone to distort an end of said split ring to align said end of said split ring with said tangential entry groove in said journal, said ring is moved into said complementary and registering grooves in said cone and said journal to rotatively retain said cone onto said journal when said cone is simultaneously moved over said journal bearing and rotated about 360°.

2. The invention as set forth in claim 1 wherein said means retained within said cone to distort an end of said split ring into said entry groove is a ramp block fixed within said cone forming a first angled surface, said angled surface being axially aligned with said first end of said split ring and a second axially aligned surface, said second surface providing a stop for said second end of said split ring, when said cone is simultaneously moved over said journal bearing and rotated 360°, said first end of said split ring distorts in an axial direction with respect to said journal while said second end of said split ring contacts said second axially disposed surface of said ramp block to move said ring into said entry groove with further rotation of said cone.

3. The invention as set forth in claim 1 further comprising a circumferential snoochie face thrust bearing forming first and second radially disposed bearing surfaces, said first bearing surface is positioned adjacent said end of said journal, said second bearing surface is positioned adjacent a radially disposed surface formed in said cone when said cone is rotatively assembled onto said journal.

4. The invention as set forth in claim 1 wherein said annular groove in said journal is circular in cross section.

5. The invention as set forth in claim 4 wherein said split ring is toroidal in shape.

6. The invention as set forth in claim 5 wherein said first and second split ends of said toroidal ring are rounded for easy access from said tangential entry groove to said registering annular grooves in said journal and cone.

7. The invention as set forth in claim 6 wherein said split ring is fabricated from metal.

8. The invention as set forth in claim 7 wherein said split ring is metal selected from a group consisting of iron, iron alloy, copper, a copper alloy, bronze, aluminum or aluminum bronze.

9. The invention as set forth in claim 8 wherein said split ring is fabricated from beryllium copper.

10. The invention as set forth in claim 9 wherein said split ring is fabricated from a spinodal alloy consisting essentially of copper, nickel and tin.

11. A method of rotatively retaining a cone onto a journal of an earth boring rock bit comprising the steps of:
    forming an annular groove in a bearing surface of said journal,
    forming a tangential entry groove in said journal, said entry groove extends from an end of said journal to said annular groove in said journal,
    forming a complementary and registering annular groove in a bearing surface formed by said cone,
    placing a split cone retention ring in said annular groove formed in said cone prior to assembly of said cone onto said journal,
    forming an angled ramp means contained within said cone, said ramp means serves to distort an end of said split ring to align said end of said ring with said tangential entry groove in said journal, and
    moving said cone axially over said journal while simultaneously rotating said cone thereby moving said split ring through said tangential entry groove into said complementary and registering annular grooves formed in said journal and said cone through about 360° of rotation thereby rotatively securing said cone to said journal.

12. The method as set forth in claim 11 further comprising the step of positioning a circumferential snoochie face thrust bearing, said thrust bearing forms first and second radially disposed bearing surfaces thereby, said first bearing surface is positioned adjacent said end of said journal, said second bearing surface being positioned adjacent a radially disposed bearing surface formed in said cone when said cone is rotatively assembled onto said journal.

13. The method as set forth in claim 11 wherein said split ring is a toroidal split ring.

14. The method as set forth in claim 13 wherein a cross section of said annular registering grooves formed in said journal and said cone is rounded to complement said toroidal ring.

15. The method as set forth in claim 14 wherein each end of said toroidal ring is rounded to ease entry of an end of said split ring into said tangential entry groove upon simultaneous axial movement and rotation of said cone over said journal.

16. The method as set forth in claim 15 wherein said toroidal split cone retention ring is fabricated from metal.

17. The method as set forth in claim 16 wherein said toroidal split ring is fabricated from a metal selected from a group consisting of iron, iron alloy, copper, copper alloy, bronze, aluminum or aluminum bronze.

18. The method as set forth in claim 17 wherein said toroidal split ring is fabricated from beryllium copper.

19. The method as set forth in claim 18 wherein said toroidal split ring is fabricated from a spinodal alloy consisting essentially of copper, nickel and tin.

20. The method as set forth in claim 11 wherein said ramp means to distort an end of said split ring axially into said tangential entry groove is a ramp block fixedly retained in said cone, said block forming a first angled ramp surface and a second axially aligned surface, said first angled ramp surface is positioned adjacent a surface of said ring, said first ramp surface forces said first end of said split ring into said entry groove in said journal, said second axially aligned surface of said ramp block acting as a stop for said second split end of said cone retention ring, simultaneous axial movement over said journal and rotation of said cone moves said first end of said ring through said entry groove in said journal, rotation of said ring through about 360° rotatively moves said split ring into said registering annular grooves in said journal and said cone rotatively securing said cone onto said journal.

* * * * *